(12) United States Patent
Hu

(10) Patent No.: US 12,450,073 B2
(45) Date of Patent: Oct. 21, 2025

(54) PARAMETER CONFIGURATION METHOD, APPARATUS, AND SYSTEM

(71) Applicant: Shenzhen Yinwang Intelligent Technologies Co., Ltd., Shenzhen (CN)

(72) Inventor: Yong Hu, Dongguan (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/324,422

(22) Filed: May 26, 2023

(65) Prior Publication Data
US 2023/0297395 A1 Sep. 21, 2023

Related U.S. Application Data

(63) Continuation of application No. PCT/CN2021/117521, filed on Sep. 9, 2021.

(30) Foreign Application Priority Data

Nov. 27, 2020 (CN) .......................... 202011364749.6

(51) Int. Cl.
*G06F 9/445* (2018.01)
(52) U.S. Cl.
CPC ................................ *G06F 9/44505* (2013.01)
(58) Field of Classification Search
CPC .................................................. G06F 9/44505
See application file for complete search history.

(56) References Cited

U.S. PATENT DOCUMENTS

| | | | |
|---|---|---|---|
| 2006/0009945 A1 | 1/2006 | Fuller et al. | |
| 2013/0103379 A1* | 4/2013 | Nam | ........................ G06F 8/30 703/22 |
| 2014/0095854 A1 | 4/2014 | Chen et al. | |
| 2015/0234690 A1 | 8/2015 | Ito et al. | |
| 2019/0163446 A1 | 5/2019 | Brunel | |
| 2019/0258460 A1 | 8/2019 | Schlachter | |

FOREIGN PATENT DOCUMENTS

| | | | |
|---|---|---|---|
| CN | 104781789 A | 7/2015 | |
| CN | 109002290 A | 12/2018 | |
| CN | 110515366 A | 11/2019 | |
| CN | 111338638 A | 6/2020 | |
| CN | 111399868 A * | 7/2020 | ......... G06F 9/44505 |

(Continued)

OTHER PUBLICATIONS

Kluge et al., "Implementing AUTOSAR Scheduling and Resource Management on an Embedded SMT Processor" (Year: 2009).*

(Continued)

*Primary Examiner* — Phillip H Nguyen
(74) *Attorney, Agent, or Firm* — Conley Rose, P.C.

(57) ABSTRACT

A parameter configuration method includes that a service layer of an embedded device that can be applied to a vehicle such as an intelligent vehicle, a connected vehicle, or a new energy vehicle directly obtains a hardware resource parameter of a hardware layer, and sends the hardware resource parameter to an AUTomotive Open System ARchitecture (AUTOSAR) development tool such that the AUTOSAR development tool generates a configuration file and an executable file.

20 Claims, 9 Drawing Sheets

(56) References Cited

FOREIGN PATENT DOCUMENTS

| JP | 4725557 B2 * | 7/2011 | |
|---|---|---|---|
| WO | WO-2021107179 A1 * | 6/2021 | ............... G06F 8/33 |

OTHER PUBLICATIONS

Sreeram, "Automated Generation and Integration of AUTOSAR ECU Configurations" (Year: 2019).*
Martorell et al., "Improving Adaptiveness of AUTOSAR Embedded Applications" (Year: 2014).*
Faragardi et al., "A resource efficient framework to run automotive emb e dde d software on multi-core ECUs" (Year: 2018).*
Park et al., "Resource-Aware Integration of Autosar-Compliant ECUs With an Empirical WCET Prediction Model" (Year: 2016).*
Peng et al., "Deployment Optimization for AUTOSAR System Configuration" (Year: 2010).*
Wind whispers, "Adaptive AUTOSAR and Connected Cars," Posted on Dec. 6, 2019, [online] https://zhuanlan.zhihu.com/p/95636928, total 9 pages.
Jingwei Hengrun, "AUTOSAR (APandCP) compliant embedded system and software design tools," (Aug. 3, 2020), [online] https://www.cnblogs.com/hirain123/p/13426477.html, total 10 pages.
AUTOSAR, Adaptive Platform, 5 pages.
Engage in automotive electronics, Adaptive Platform AUTOSAR (AP) platform design (2)—architecture, Adaptive platform AUTOSAR, Apr. 13, 2020, with an English translation, 24 pages.
Chubby Zaemon, Graphical AUTOSAR (3)—Methodology, May 13, 2018, with an English translation, 6 pages.
AUTOSAR, Specification of Manifest, AUTOSAR AP R19-11, Nov. 28, 2019, 826 pages.
AUTOSAR, "Specification of ECU Configuration," AUTOSAR CP R21-11, Nov. 25, 2021, total 305 pages.
AUTOSAR, "Specification of Basic Software Mode Manager," AUTOSAR CP R19-11, Nov. 28, 2019, total 155 pages.

* cited by examiner

| Ethernet parameter | |
|---|---|
| Property | Value |
| Baud rate | |
| Checksum | |
| Coupling port switchoff delay | |
| Protocol name | |
| Protocol version | |
| Rate | |
| Timestamp | |

| IPv4 configuration parameter | |
|---|---|
| Property | Value |
| Assignment priority | |
| Checksum | |
| Default gateway | a.a.a |
| DNS server address | b.b.b |
| IP address keep behavior | Store persistently |
| IPv4 address | c.c.c |
| IPv4 address source | DHCPV-4 |
| Network mask | x.x.x.x |
| Timestamp | |
| Time-to-live value | 255 |

FIG. 6

PARAMETER CONFIGURATION METHOD, APPARATUS, AND SYSTEM

CROSS-REFERENCE TO RELATED APPLICATIONS

This application is a continuation application of International Patent Application No. PCT/CN2021/117521 filed on Sep. 9, 2021, which claims priority to Chinese Patent Application No. 202011364749.6 filed on Nov. 27, 2020. The disclosures of the aforementioned applications are hereby incorporated by reference in their entireties.

TECHNICAL FIELD

This application relates to the field of intelligent vehicles, and in particular, to a parameter configuration method, an apparatus, and a system.

BACKGROUND

AUTomotive Open System ARchitecture (AUTOSAR) is an open and standardized software architecture developed for an automotive industry.

When an application is developed based on AUTOSAR, a user may remotely connect to a device by using a protocol such as a remote terminal (TELNET) or a SECURE SHELL (SSH), and determine a hardware form of the device by entering a command line, or the user may check a hardware manual to determine the hardware form of the device. Then, the user may manually enter a hardware resource parameter in an AUTOSAR configuration tool based on the hardware form. The configuration tool may generate a description file based on a hardware resource parameter entered by the user, and an AUTOSAR generation tool may further generate a configuration file and an executable file based on the description file.

However, in the foregoing development process, because the user needs to manually enter the hardware resource parameter, parameter configuration efficiency is low.

SUMMARY

This application provides a parameter configuration method, an apparatus, and a system, to resolve a problem of low parameter configuration efficiency caused by manual parameter configuration.

According to one aspect, a parameter configuration method is provided, and is applied to an embedded device using AUTOSAR. The embedded device includes a hardware layer, a service layer, and an application layer. The method includes the following. The service layer obtains a hardware resource parameter of the hardware layer, and sends the hardware resource parameter to an AUTOSAR development tool. The hardware resource parameter is used by the AUTOSAR development tool to generate an executable file and a configuration file, and the executable file and the configuration file can be stored at the hardware layer. Then, the service layer can run the executable file based on the configuration file.

Because the service layer can directly obtain the hardware resource parameter of the hardware layer, and send the hardware resource parameter to the AUTOSAR development tool, a developer does not need to manually enter the hardware resource parameter in the development tool. Therefore, parameter configuration efficiency can be effectively improved, and a probability of incorrect parameter configuration can be reduced.

Optionally, the configuration file includes a resource management policy. The method may further include the following. The service layer adjusts, based on the resource management policy, a running status of a hardware resource included in the hardware layer.

The service layer can flexibly schedule the hardware resource based on the resource management policy in the configuration file.

Optionally, the resource management policy may include an identifier and a first property of a target hardware resource, and the first property indicates a resource management manner for the target hardware resource. A process in which the service layer adjusts, based on the resource management policy, the running status of the hardware resource included in the hardware layer may include the following. The service layer adjusts, based on the resource management manner indicated by the first property, a running status of the target hardware resource indicated by the identifier.

In the resource management policy, different resource management manners may be configured for different hardware resources, so that the service layer can perform targeted adjustment on running statuses of different hardware resources based on the resource management policy.

Optionally, the resource management policy may further include a second property. The second property indicates a startup condition for managing the target hardware resource. A process in which the service layer adjusts, based on the resource management manner indicated by the first property, the running status of the target hardware resource indicated by the identifier may include the following. If the service layer determines that the running status of the target hardware resource indicated by the identifier meets the startup condition indicated by the second property, the service layer adjusts the running status of the target hardware resource based on the resource management manner indicated by the first property.

In other words, the service layer may adjust the running status of the target hardware resource after determining that the running status of the target hardware resource meets the startup condition. If the service layer determines that the running status of the target hardware resource does not meet the startup condition, the service layer does not need to adjust the running status of the target hardware resource. In this way, performance of the embedded device can be prevented from being affected by misadjusting the running status of the hardware resource, and reliability of resource scheduling is ensured.

Optionally, the resource management manner includes disabling the target hardware resource, or reducing a working frequency of the target hardware resource.

The service layer can effectively reduce power consumption of the embedded device by disabling the target hardware resource or reducing the working frequency of the target hardware resource.

Optionally, a process in which the service layer adjusts, based on the resource management policy, the running status of the hardware resource included in the hardware layer may include the following. If the service layer detects that a state switching occurs in the embedded device and the state switching meets a hardware resource adjustment condition, the service layer adjusts the running status of the hardware resource based on the resource management policy.

The adjustment condition may be preconfigured at the service layer, or may be carried in the configuration file. The running status of the hardware resource is adjusted when the state switching meets the adjustment condition, so that an unstable state of the embedded device caused by frequent adjustment of the running status of the hardware resource can be avoided.

Optionally, a process in which the service layer obtains the hardware resource parameter of the hardware layer may include the following. The service layer receives a configuration command sent by the AUTOSAR development tool, and the service layer obtains the hardware resource parameter of the hardware layer according to the configuration command.

Optionally, the hardware resource parameter may include a machine parameter and a system parameter. The machine parameter may include at least a related parameter of a processor, a related parameter of a memory, and a related parameter of a hard disk. The system parameter may include a network parameter, for example, may include a related parameter of a network adapter.

According to another aspect, an embedded device is provided. The embedded device uses AUTOSAR, and the embedded device includes a hardware layer, a service layer, and an application layer. The service layer may include a communication interface and at least one module. The communication interface and the at least one module may be configured to implement the parameter configuration method provided in the foregoing aspect.

According to still another aspect, an embedded device is provided. The embedded device uses AUTOSAR, and the embedded device includes a memory and a processor. The memory is configured to store a computer program. The processor is configured to execute the computer program stored in the memory, so that the embedded device performs the parameter configuration method provided in the foregoing aspect.

According to yet another aspect, a parameter configuration system is provided. The system includes an AUTOSAR development tool, and the embedded device according to the foregoing aspects. The AUTOSAR development tool is configured to generate an executable file and a configuration file based on a hardware resource parameter sent by a service layer of the embedded device.

According to still yet another aspect, a computer-readable storage medium is provided. The computer-readable storage medium stores instructions, and the instructions are executed by a processor to implement the parameter configuration method provided in the foregoing aspect.

According to a further aspect, a computer program product including instructions is provided. When the computer program product runs on a computer, the computer is enabled to perform the parameter configuration method provided in the foregoing aspect.

According to a still further aspect, a chip is provided. The chip includes a programmable logic circuit and/or program instructions, and when running, the chip is configured to implement the parameter configuration method provided in the foregoing aspect.

The technical solutions provided in this application include at least the following beneficial effects.

This application provides a parameter configuration method, an apparatus, and a system. A service layer of an embedded device may directly obtain a hardware resource parameter of a hardware layer, and send the hardware resource parameter to an AUTOSAR development tool, so that the AUTOSAR development tool generates a configuration file and an executable file. A developer does not need to manually enter the hardware resource parameter in the development tool. Therefore, parameter configuration efficiency can be effectively improved, a probability of incorrect parameter configuration can be reduced, and application development efficiency can be further improved.

BRIEF DESCRIPTION OF DRAWINGS

FIG. 6 is a schematic diagram of a configuration interface of another configuration tool according to an embodiment of this application;

DESCRIPTION OF EMBODIMENTS

With reference to the accompanying drawings, the following describes in detail a parameter configuration method, an apparatus, and a system provided in embodiments of this application.

A basic software (BSW) layer in an AUTOSAR layered software architecture can be applied to vehicles produced by different manufacturers and electronic components provided by different suppliers. This reduces research and development expenses and can adapt to the increasingly complex automotive electrical and software architectures. AUTOSAR includes two main types of platforms:

1. AUTOSAR classic platform (CP): The AUTOSAR CP is an embedded real-time electronic control unit (ECU) standard based on the open systems and the corresponding interfaces for automotive electronics (OSEK) standard. An architecture of the AUTOSAR CP includes an application layer running on a microcontroller, a runtime environment (RTE) layer, and a BSW layer. The application layer is basically independent of hardware. Software components at the application layer communicate with each other by using the RTE layer, and the software components also need to access the BSW by using the RTE.

2. AUTOSAR AP: The AUTOSAR AP can use two types of interfaces: a service interface and an application programming interface (API). The AUTOSAR AP consists of functional clusters distributed at a service layer and an AUTOSAR AP base.

Figure 1:
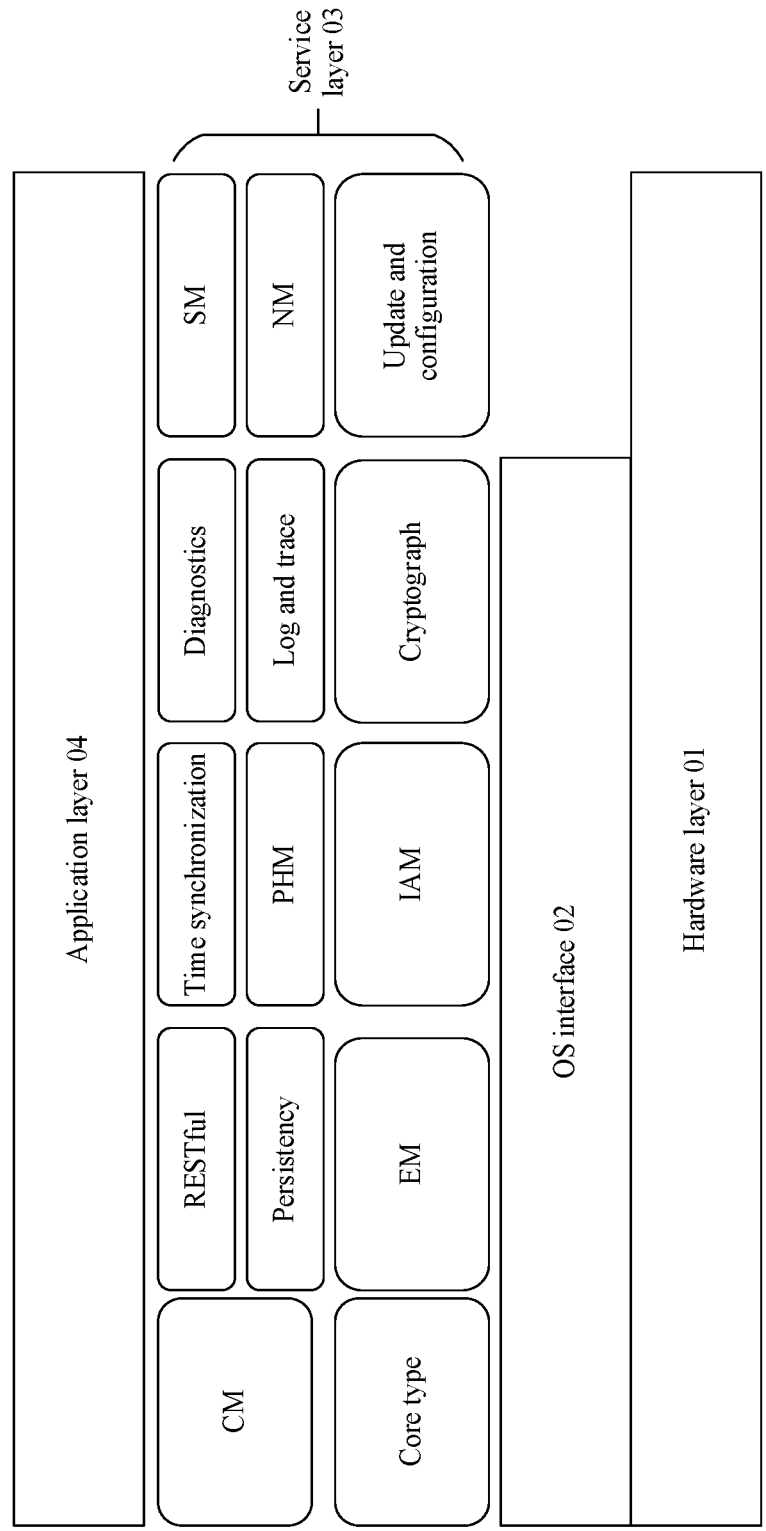
FIG. 1 is an architectural diagram of an AUTOSAR adaptive platform (AP) according to an embodiment of this application.

FIG. 1 is an architectural diagram of an AUTOSAR AP according to an embodiment of this application. As shown in FIG. 1, an architecture of the AUTOSAR AP may include a hardware layer 01, an operating system (OS) interface 02, a service layer 03, and an application layer 04. The OS interface 02 may be a portable operating system interface (POSIX). The service layer 03 may include multiple middleware, and the middleware may also be referred to as a service module.

For example, refer to FIG. 1. The service layer 03 may include the following service modules: a communication management (CM) module, a core type module, a RESTful module, a persistency module, an execution management (EM) module, a time synchronization module, a platform health management (PHM) module, an identity and access management (IAM) module, a diagnostics module, a log and trace module, a cryptograph module, a state management (SM) module, a network management (NM) module, an update and configuration management module, and the like. RESTful is a development manner based on representational state transfer (REST).

With the advent of automobile intelligence and electrification, an electronic computing power of an automobile is increasingly high, a memory is increasingly large, and an electronic and electrical structure is increasingly complex. As a result, AUTOSAR configuration items are large in scale, complex in structure, and high in learning threshold. For example, as a hardware structure of a device is increasingly complex, a hardware resource parameter that needs to be manually entered by a user increases. As a result, a parameter configuration process is error-prone, and configuration efficiency is low.

Figure 2:
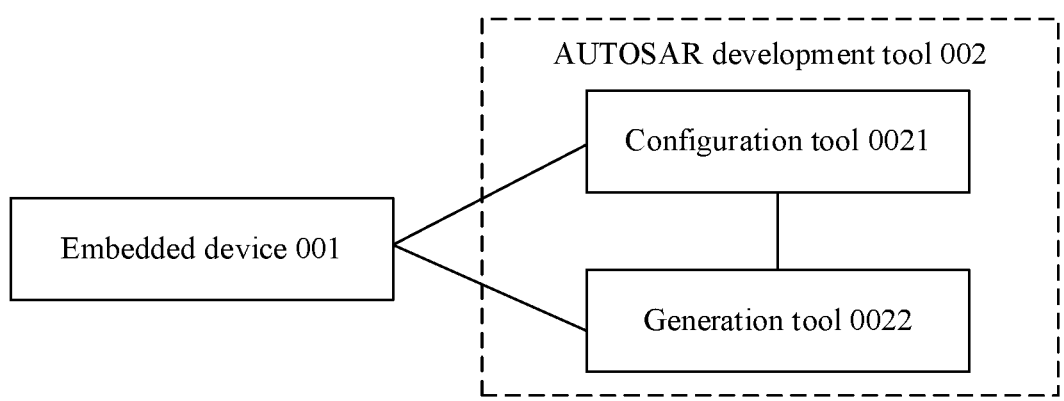
FIG. 2 is a schematic diagram of an application scenario of a parameter configuration method according to an embodiment of this application.

An embodiment of this application provides a parameter configuration method, to resolve a problem of low efficiency in configuring a hardware resource parameter. FIG. 2 is a schematic diagram of an application scenario of a parameter configuration method according to an embodiment of this application. As shown in FIG. 2, the application scenario may include an embedded device 001 using AUTOSAR, and an AUTOSAR development tool 002. The AUTOSAR development tool 002 may include a configuration tool 0021 and a generation tool 0022. The configuration tool 0021 is configured to generate a description file based on obtained configuration parameters (including a hardware resource parameter and a functional configuration parameter). The generation tool 0022 is configured to generate a configuration file and an executable (exe) file based on the description file. For example, the generation tool 0022 may generate a code file based on the description file, and then compile the code file to obtain an executable file.

The description file may be a file in an AUTOSAR extensible markup language (AUTOSAR arxml) format. The configuration file may be a file in a JAVASCRIPT (a scripting language) object notation (JSON) format.

Figure 3:
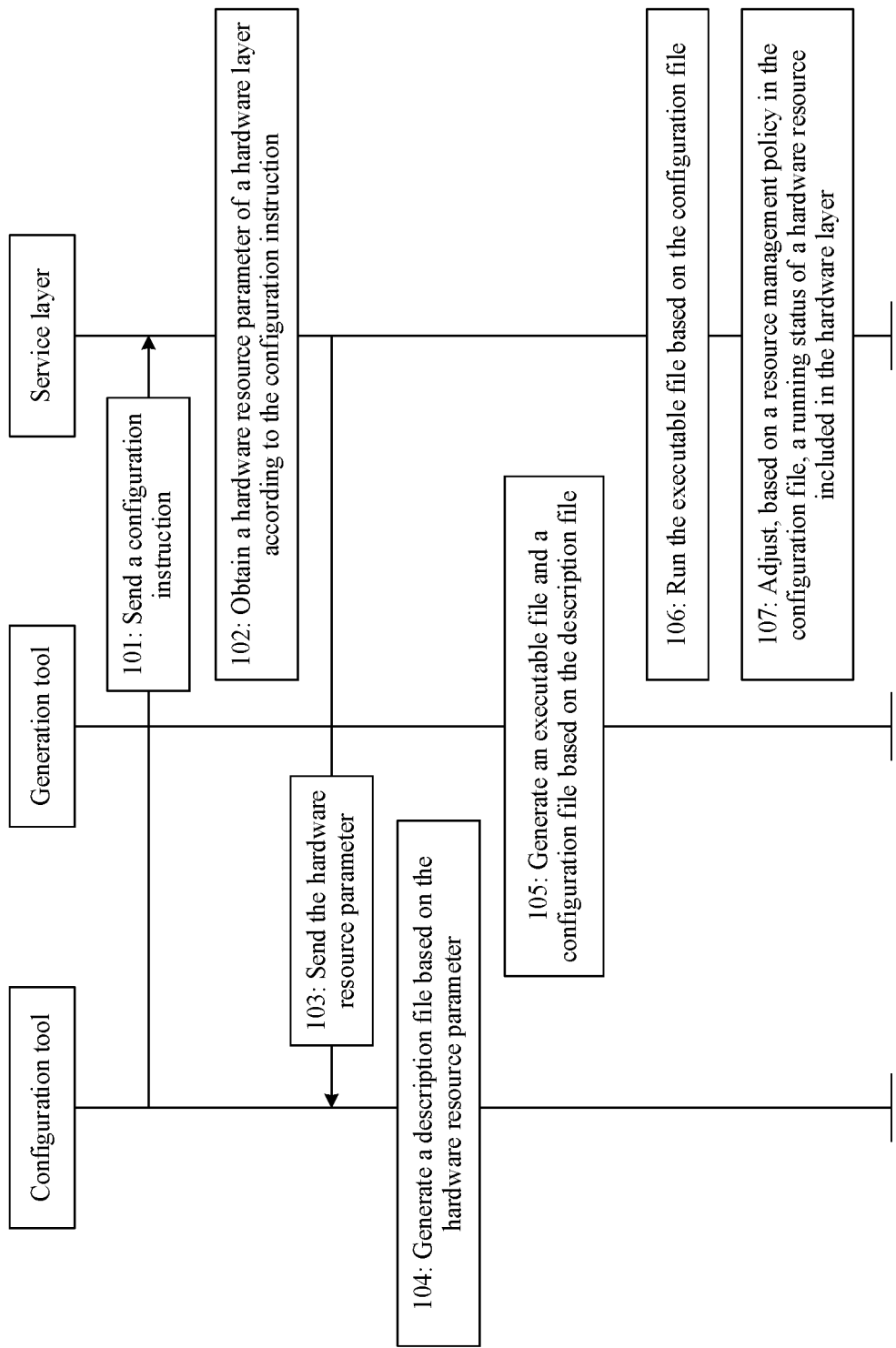
FIG. 3 is a flowchart of a parameter configuration method according to an embodiment of this application.

FIG. 3 is a flowchart of a parameter configuration method according to an embodiment of this application. The method may be applied to the application scenario shown in FIG. 2. For example, the embedded device 001 shown in FIG. 2 may use an AUTOSAR AP. As shown in FIG. 1, the embedded device 001 may include the hardware layer 01, the service layer 03, and the application layer 04. Refer to FIG. 2. The method includes the following steps.

Step 101: A configuration tool sends a configuration instruction to a service layer.

In this embodiment of this application, when the configuration tool needs to obtain a hardware resource parameter of a hardware layer in the embedded device to generate a description file, the configuration tool may send the configuration instruction to the service layer. The configuration instruction is used to instruct the service layer to obtain the hardware resource parameter of the hardware layer.

Optionally, there may be one target service module in a plurality of service modules included in the service layer of the embedded device. The target service module can communicate with the configuration tool, and can schedule and manage a hardware resource included in the hardware layer. The target service module may be an EM module, an SM module, a CM module, a PHM module, or the like at the service layer.

Figure 4:
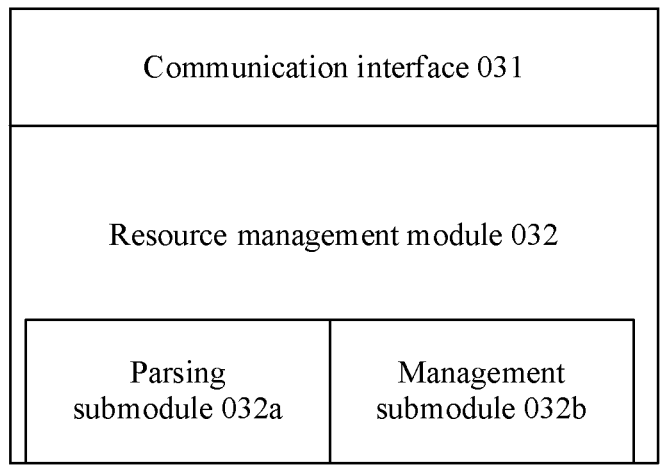
FIG. 4 is a schematic diagram of a structure of a target service module at a service layer according to an embodiment of this application.

FIG. 4 is a schematic diagram of a structure of a target service module at a service layer according to an embodiment of this application. As shown in FIG. 4, the target service module may include a communication interface 031 and a resource management module 032. The communication interface 031 is configured to communicate with the configuration tool. Correspondingly, the configuration tool may send the configuration instruction to the communication interface 031 of the target service module at the service layer. The resource management module 032 includes a parsing submodule 032a and a management submodule 032b. The parsing submodule 032a is configured to parse and obtain the hardware resource parameter of the hardware layer, and the management submodule 032b is configured to schedule and manage the hardware resource included in the hardware layer.

The communication interface 031 may be an interface developed based on a protocol such as a Transmission Control Protocol (TCP), a Hypertext Transfer Protocol (HTTP), or a remote procedure call (RPC).

Step 102: The service layer obtains the hardware resource parameter of the hardware layer according to the configuration instruction.

After receiving the configuration instruction, the service layer of the embedded device may obtain the hardware resource parameter of the hardware layer in response to the configuration instruction. In this embodiment of this application, the hardware resource parameter may include a machine parameter and a system parameter. The machine parameter may include at least a related parameter of a processor, a related parameter of a memory, and a related parameter of a hard disk. The system parameter may include a network parameter, for example, may include a related parameter of a network adapter. The processor may include a central processing unit (CPU), or the like, and the processor may include a plurality of processor cores.

Optionally, in addition to the machine parameter and the system parameter, the hardware resource parameter may further include another type of parameter, and the other type of parameter may include a related parameter of an electronic control unit (ECU), a related parameter of a microcontroller unit (MCU), a related parameter of a peripheral (for example, a camera, and a sensor such as a laser radar), and the like.

Refer to FIG. 4. After receiving the configuration instruction, the communication interface 031 of the target service module at the service layer may send the configuration instruction to the resource management module 032. The parsing submodule 032a in the resource management module 032 may further obtain the hardware resource parameter of the hardware layer in response to the configuration instruction.

Step 103: The service layer sends the hardware resource parameter to the configuration tool.

After obtaining the hardware resource parameter, the service layer may send the hardware resource parameter to the configuration tool in the AUTOSAR development tool.

The hardware resource parameter is used by the configuration tool to generate the description file, and a generation tool in the development tool may further generate an executable file and a configuration file based on the description file.

For example, refer to FIG. 4. The target service module at the service layer may send the obtained hardware resource parameter to the configuration tool through the communication interface 031.

Figure 5:
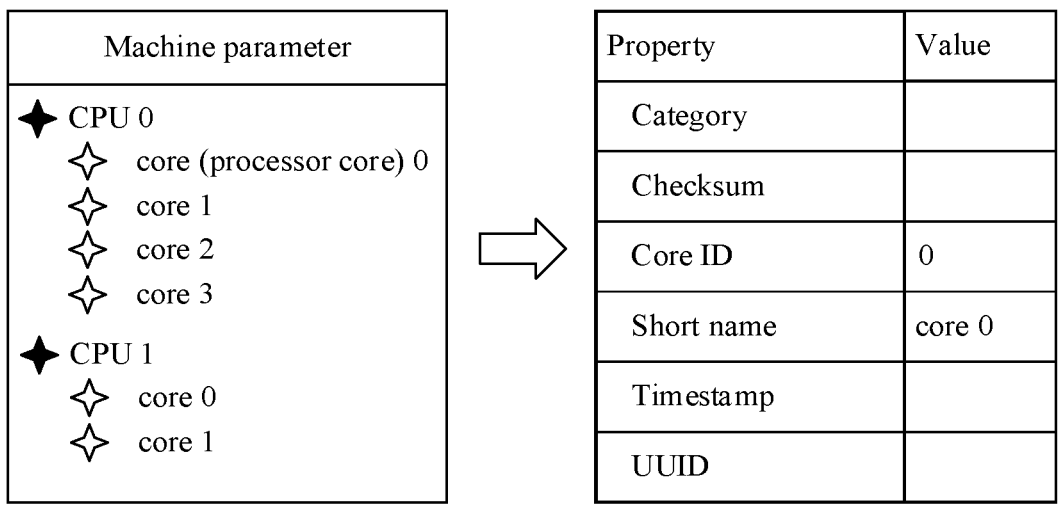
FIG. 5 is a schematic diagram of a configuration interface of a configuration tool according to an embodiment of this application.

FIG. 5 is a schematic diagram of a configuration interface of a configuration tool according to an embodiment of this application. As shown in FIG. 5, a machine parameter that is sent by a service layer and that is received by the configuration tool may include a related parameter of a CPU, and the related parameter of the CPU may include a parameter of each core in the CPU. For example, refer to FIG. 5. The related parameter of the CPU may include parameters of a core 0 to a core 3 in a CPU 0, and parameters of a core 0 and a core 1 in a CPU 1. A parameter of each core may include the following properties: a category, a checksum, a core identifier (ID), a short name, a timestamp, and a universally unique identifier (UUID).

FIG. 6 is a schematic diagram of a configuration interface of another configuration tool according to an embodiment of this application. As shown in FIG. 6, a system parameter that is sent by a service layer and that is received by the configuration tool may include a related parameter of the Ethernet. Refer to FIG. 6. The related parameter of the Ethernet may include at least one of the following properties: a baud rate, a checksum, a coupling port switchoff delay, a protocol name, a protocol version, a speed, and a timestamp.

The related parameter of the Ethernet may further include an Internet Protocol (IP) version 4 (IPv4) configuration parameter, and the IPv4 configuration parameter may include at least one of the following properties: an assignment priority, a checksum, a default gateway, a domain name system (DNS) server address, IP address keep behavior, an IPv4 address, an IPv4 address source, a network mask, a timestamp, and a time-to-live (TTL) value. A value of the property: IP address keep behavior is: store persistently, and a value of the property: IPv4 address source is: DHCPV-4, which represents a Dynamic Host Configuration Protocol (DHCP) used to configure an IP address required by an IPv4 host.

Step 104: The configuration tool generates the description file based on the hardware resource parameter.

In this embodiment of this application, an AUTOSAR metamodel is preconfigured in the configuration tool. After receiving the hardware resource parameter sent by the server layer, the configuration tool may generate an AUTOSAR model based on the hardware resource parameter and the metamodel. This process may also be referred to as mapping the hardware resource parameter to an AUTOSAR model. Then, the AUTOSAR model is exported from a memory of the configuration tool to a hard disk of the configuration tool, to obtain the description file. The description file may be a file in an .arxml format.

The AUTOSAR metamodel is a unified modeling language (UML) model for defining a language for describing an AUTOSAR system, and is a graphical representation of a template (the template defines structures such as a software component and the ECU to create AUTOSAR hardware and software systems). The AUTOSAR model is an instance of the AUTOSAR metamodel.

Step 105: The generation tool generates the executable file and the configuration file based on the description file.

After the configuration tool generates the description file, the generation tool may obtain the description file and generate the executable file and the configuration file based on the description file. The executable file may be a file in an .exe format, and the configuration file may be a file in a .json format. In this embodiment of this application, a developer may further store both the executable file and the configuration file that are generated by the generation tool into the hardware layer of the embedded device.

Step 106: The service layer runs the executable file based on the configuration file.

In this embodiment of this application, the service layer may read the configuration file at the hardware layer, and run the executable file based on the configuration file.

Step 107: The service layer adjusts, based on a resource management policy in the configuration file, a running status of the hardware resource included in the hardware layer.

The configuration file may include the resource management policy. The service layer may adjust, based on the resource management policy in a running process of the embedded device, the running status of the hardware resource included in the hardware layer. In this way, the hardware resource can be flexibly scheduled and managed, and power consumption of the embedded device can be effectively reduced without affecting proper running of the embedded device.

Optionally, the resource management policy in the configuration file may include at least one policy configuration item, and each policy configuration item is used to indicate a management policy for a hardware resource at the hardware layer. The target hardware resource at the hardware layer is used as an example. A policy configuration item of the target hardware resource may include an identifier and a first property of the target hardware resource. The first property indicates a resource management manner for the target hardware resource, and the resource management manner may include disabling the target hardware resource, or reducing a working frequency of the target hardware resource.

For example, if the target hardware resource is a processor core, the identifier of the target hardware resource may include an identifier (ID) of the processor core and an ID of a processor to which the processor core belongs. If the target hardware resource is a sensor, the identifier of the target hardware resource may be an ID of the sensor.

It may be understood that, in the resource management policy, different resource management manners may be configured for different hardware resources, so that the service layer can perform targeted adjustment on running statuses of different hardware resources based on the resource management policy.

In this embodiment of this application, the policy configuration item of the target hardware resource may further include a second property, and the second property indicates a startup condition for managing the target hardware resource. In other words, the service layer may adjust a running status of the target hardware resource after determining that the running status of the target hardware resource meets the startup condition. In this way, performance of the embedded device can be prevented from being affected by misadjusting a running status of the hardware resource, and reliability of resource scheduling is ensured.

Figure 7:
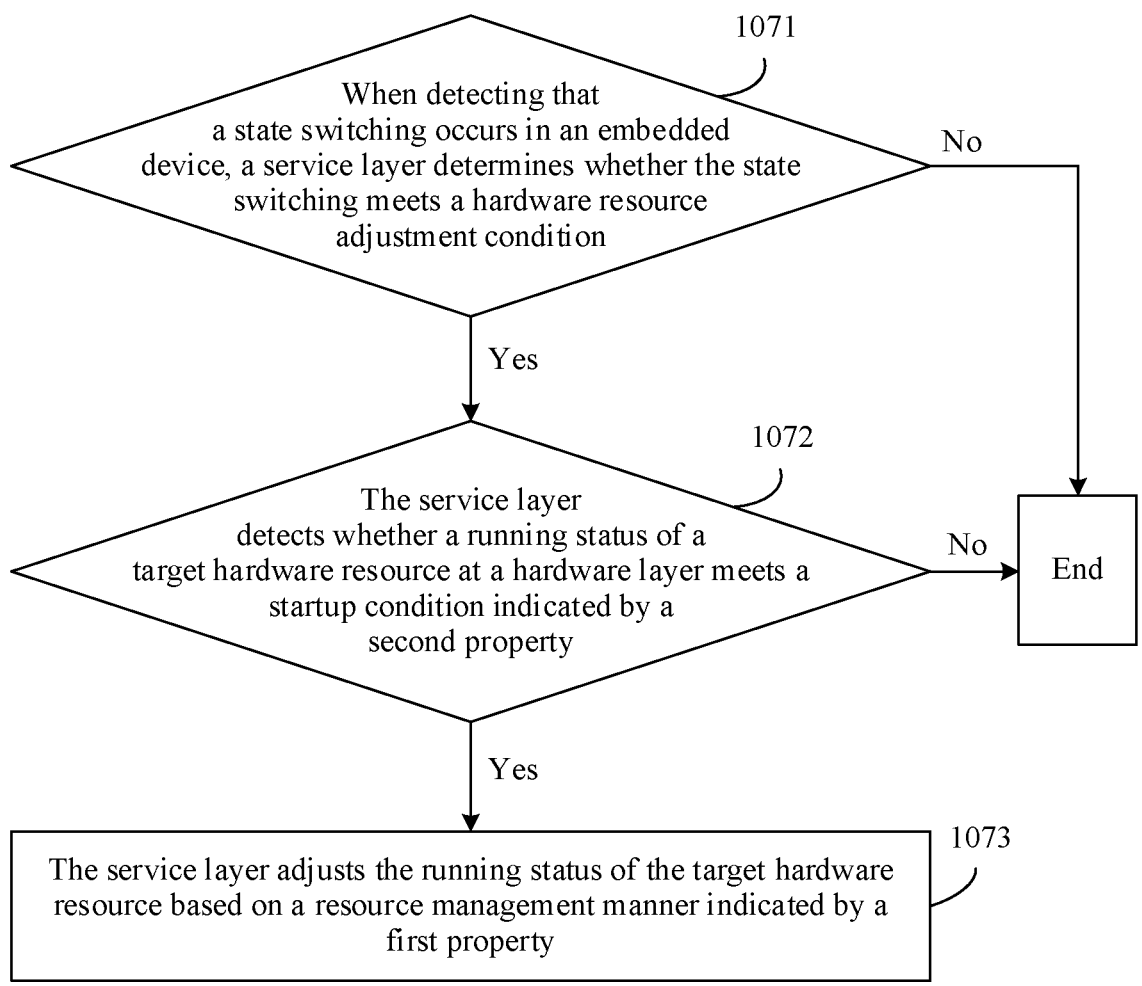
FIG. 7 is a flowchart of a method for adjusting a running status of a hardware resource according to an embodiment of this application.

An implementation process of step 107 is described by using an example in which the policy configuration item of the target hardware resource includes the identifier, the first property, and the second property of the target hardware resource. Refer to FIG. 7. Step 107 may include the following steps.

Step 1071: When detecting that a state switching occurs in the embedded device, the service layer determines whether the state switching meets a hardware resource adjustment condition.

In this embodiment of this application, the service layer may monitor a status (or a status of a machine) of the embedded device in real time in a running process of the embedded device. When detecting that a state of the embedded device changes, that is, when the state of the embedded device is switched, the service layer may further detect whether the state switching meets the hardware resource adjustment condition. If the service layer determines that the state switching meets the hardware resource adjustment condition, step 1072 may be performed. If the service layer determines that the state switching does not meet the hardware resource adjustment condition, the service layer may end the operation, that is, does not adjust the running status of the hardware resource. In addition, the service layer may continue to monitor the status of the embedded device.

The adjustment condition may be preconfigured at the service layer, or may be carried in the configuration file. For example, the adjustment condition may include one or more of the following conditions. Before and after the state switching, a change amount of hardware resource usage (for example, CPU usage) is greater than a change amount threshold, after the state switching, the hardware resource usage is less than a usage threshold, after the state switching, some processes are in a zombie state, and after the state switching, a task executed by the embedded device is a task whose performance consumption is lower than a consumption threshold.

According to the method provided in this embodiment of this application, the running status of the hardware resource may be adjusted when the state switching meets the adjustment condition, so that an unstable state of the embedded device caused by frequent adjustment of the running status of the hardware resource can be avoided.

Step 1072: The service layer detects whether the running status of the target hardware resource at the hardware layer meets the startup condition indicated by the second property.

When detecting that the state switching of the embedded device meets the hardware resource adjustment condition, the service layer may adjust, based on the resource management policy in the configuration file, the running status of the hardware resource included in the hardware layer. If the resource management policy includes the policy configuration item of the target hardware resource, the service layer may determine the target hardware resource at the hardware layer based on the identifier in the policy configuration item, and detect whether the target hardware resource meets the startup condition indicated by the second property.

If the service layer determines that the running status of the target hardware resource meets the startup condition indicated by the second property, the service layer may continue to perform step 1073. If the service layer determines that the running status of the target hardware resource does not meet the startup condition indicated by the second property, the service layer may end the operation, that is, does not adjust the running status of the target hardware resource. In this way, performance of the embedded device can be prevented from being affected by misadjusting the running status of the hardware resource, and reliability of resource scheduling is ensured.

Step 1073: The service layer adjusts the running status of the target hardware resource based on the resource management manner indicated by the first property.

If the service layer determines that the running status of the target hardware resource meets the startup condition indicated by the second property, the service layer may adjust the running status of the target hardware resource based on the resource management manner indicated by the first property.

For example, it is assumed that the target hardware resource is a processor core at the hardware layer, and the resource management manner indicated by the first property in a resource configuration item of the processor core is: disabling the processor core, the startup condition indicated by the second property is: usage of the processor core is less than 10%. In this case, the service layer may disable the processor core when detecting that the usage of the processor core is less than 10%.

It should be understood that the hardware layer may include a plurality of hardware resources, for example, may include a processor, a memory, a network adapter, an ECU, an MCU, a peripheral, and the like, and the processor may further include a plurality of different processor cores. Therefore, the resource management policy may include policy configuration items of a plurality of different hardware resources. Correspondingly, the service layer may adjust, based on each policy configuration item, a running status of a corresponding hardware resource, to implement flexible scheduling of the hardware resource at the hardware layer.

In this embodiment of this application, for at least one type of hardware resource at the hardware layer (for example, the processor, the memory, the network adapter, the ECU, the MCU, the peripheral, and the like), a policy configuration (strategy config) item for managing the hardware resource may be added to a metamodel stored in the configuration tool. After the configuration tool generates the configuration file based on the metamodel, the configuration file may include the policy configuration item of the hardware resource.

For example, a processor at the hardware layer is a CPU. For a processor core in the CPU, a new policy configuration item added to the metamodel may be shown in Table 1, and a basetype of the policy configuration item is an AUTOSAR object (AR object) type. Refer to Table 1. It can be learned that the policy configuration item includes a plurality of properties (attributes (attr)).

A type of a property whose property name is Shortname may be a string, a configurable quantity of the property is 1, and the property may be used to identify a name of the policy configuration item. For example, the name of the policy configuration item of the CPU may be CPU Strategy Config.

A type of a property whose property name is CpuId may be a non-negative integer, a quantity of configurable properties is 1, the property may be used to identify a processor (corresponding to the processor in the machine parameter) to which a processor core belongs, and a value range of the property may be greater than or equal to 0.

A type of a property whose property name is CoreId may be a non-negative integer, a quantity of configurable properties is 1, the property may be used to identify a processor core (corresponding to the processor core in the machine parameter), and a value range of the property may be greater than or equal to 0.

A type of a property whose property name is Method (mode) may be an enumeration (enum) type, a quantity of configurable properties is 1, the property may be used to indicate a resource management manner, and a value of the property may be reduce working frequency or close.

A type of a property whose property name is Threshold may be a non-negative integer, a quantity of configurable properties is 0 or 1, the property may be used to indicate a lower threshold that a usage rate needs to reach when resource management is started, and a value range of the property may be [0, 100]. That is, when usage of the processor core is greater than a value of the property whose property name is Threshold, the service layer may adjust the running status of the processor core based on the resource management manner indicated by the property whose property name is Method.

A quantity of configurable properties in Table 1 indicates whether the policy configuration item needs to contain the property. If the quantity of configurable properties is 1, the policy configuration item needs to contain the property. If the quantity of configurable properties is 0 or 1, the policy configuration item may contain the property or not contain the property. For example, the property whose property name is Threshold may not be included in the policy configuration item of the processor core shown in Table 1.

TABLE 1

| Property name | Type | Quantity | Category | Description |
|---|---|---|---|---|
| Shortname | String | 1 | attr | Name of a policy configuration item |
| CpuId | Non-negative Integer | 1 | attr | Identify a CPU to which a CPU core belongs, where a value range is ≥0 |
| CoreId | Non-negative Integer | 1 | attr | Identify a processor core, where a value range is ≥0 |
| Method | Enum | 1 | attr | Indicate a resource management manner, where a value is reduce/close |
| Threshold | Non-negative Integer | 0, 1 | attr | Indicate a threshold for starting resource management, where a value range is [0, 100] |

It may be understood that, after the configuration tool generates the configuration file based on the metamodel, in the policy configuration item of the processor core in the configuration file, the identifier of the processor core includes a value of the property whose property name is CpuId, and a value of the property whose property name is CoreId. The first property is a value of the property whose property name is Method, and the second property is a value of the property whose property name is Threshold. It may be further understood that, for policy configuration items of hardware resources such as the ECU and the MCU at the hardware layer, refer to Table 1.

For the peripheral at the hardware layer, the new policy configuration item added to the metamodel may be shown in Table 2. Refer to Table 2. It can be learned that the policy configuration item may also include a plurality of properties. A type of a property whose property name is Shortname may be a string, a quantity of configurable properties is 1, and the property may be used to identify a name of the policy configuration item. For example, the name may be Device Power Config.

A type of a property whose property name is DeviceID may be a non-negative integer, a quantity of configurable properties is 1, and the property may be used to identify an identifier of a peripheral that needs to perform resource management.

A type of a property whose property name is Method may be an enumeration type, a quantity of configurable properties is 1, and the property may be used to indicate a resource management manner. For example, a value of the property may be reducing a working frequency or disabling.

TABLE 2

| Property name | Type | Quantity | Category | Description |
|---|---|---|---|---|
| Shortname | String | 1 | attr | Name of a policy configuration item |
| DeviceID | Non-negative Integer | 1 | attr | Identifier of a hardware resource |
| Method | Enum | 1 | attr | Indicate a resource management manner, where a value is reduce/close |

In this embodiment of this application, if the configuration file includes the resource configuration item of the hardware resource, the target service module may manage the hardware resource based on a device status in the running process of the embedded device. For example, assuming that the configuration file includes a resource configuration item of a laser radar, and the value of the property whose property name is Method in the resource configuration item is disabling, the target service module may power off the laser radar in a parking state. If the configuration file includes a resource configuration item of a front-facing camera, and the value of the property whose property name is Method in the resource configuration item is disabling, the target service module may power off the front-facing camera when reversing.

It may be further understood that a sequence of steps of the foregoing parameter configuration method provided in this embodiment of this application may be properly adjusted, or steps may be correspondingly added or deleted based on a situation. For example, step 101 may be deleted based on a situation. Alternatively, step 1071 may be deleted based on a situation, that is, when detecting that the state switching occurs in the embedded device, the service layer may directly adjust the running status of the hardware resource based on the resource management policy, without determining whether the state switching meets the adjustment condition. Alternatively, step 1072 may be deleted based on a situation, that is, the policy configuration item may not include the second property. Correspondingly, the service layer does not need to determine whether the running status of the target hardware resource meets the startup condition, but can directly adjust the running status of the target hardware resource based on the resource management manner indicated by the first property.

Figure 8A:
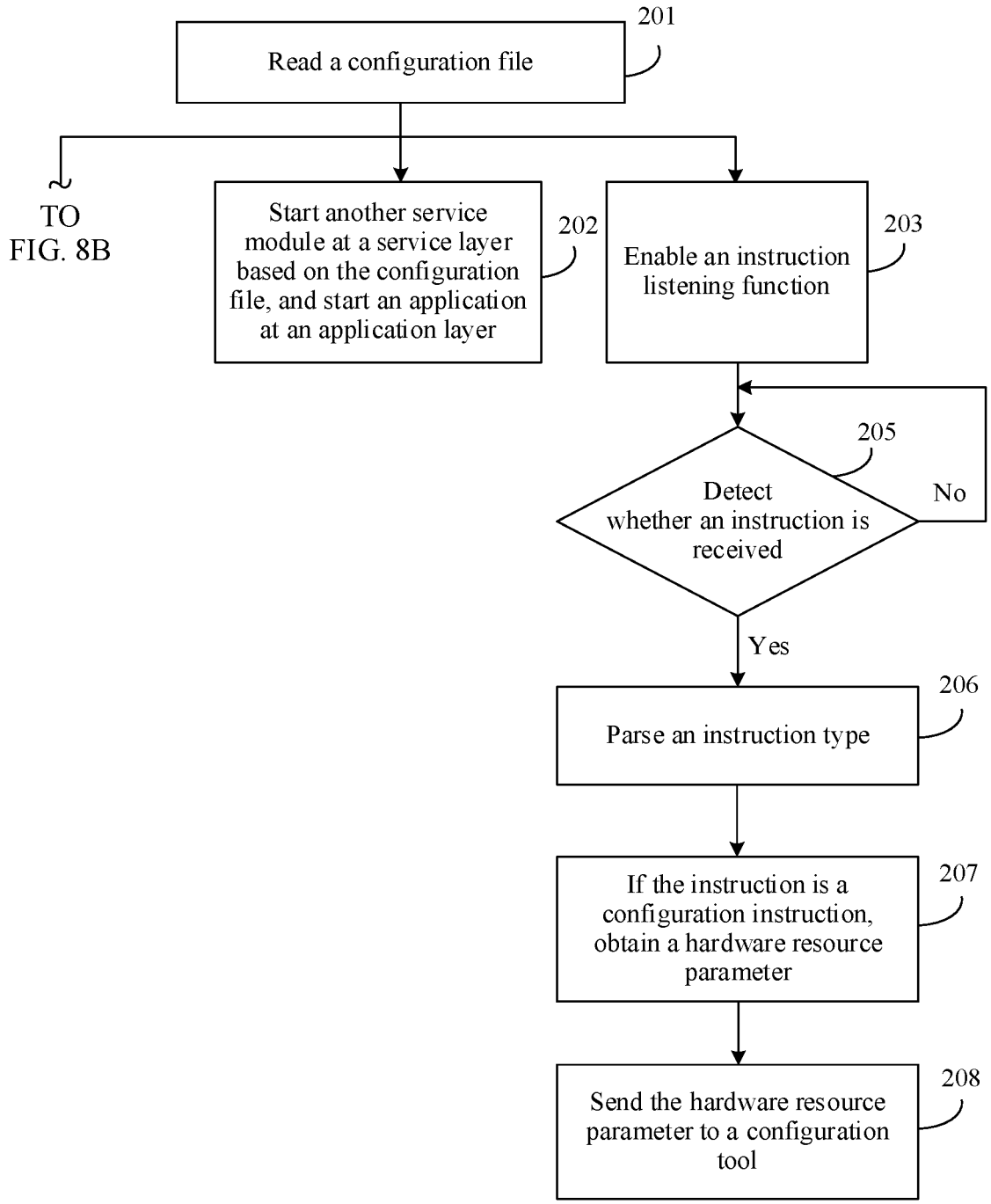
FIG. 8A and FIG. 8B are a flowchart of another parameter configuration method according to an embodiment of this application.
Figure 8B:
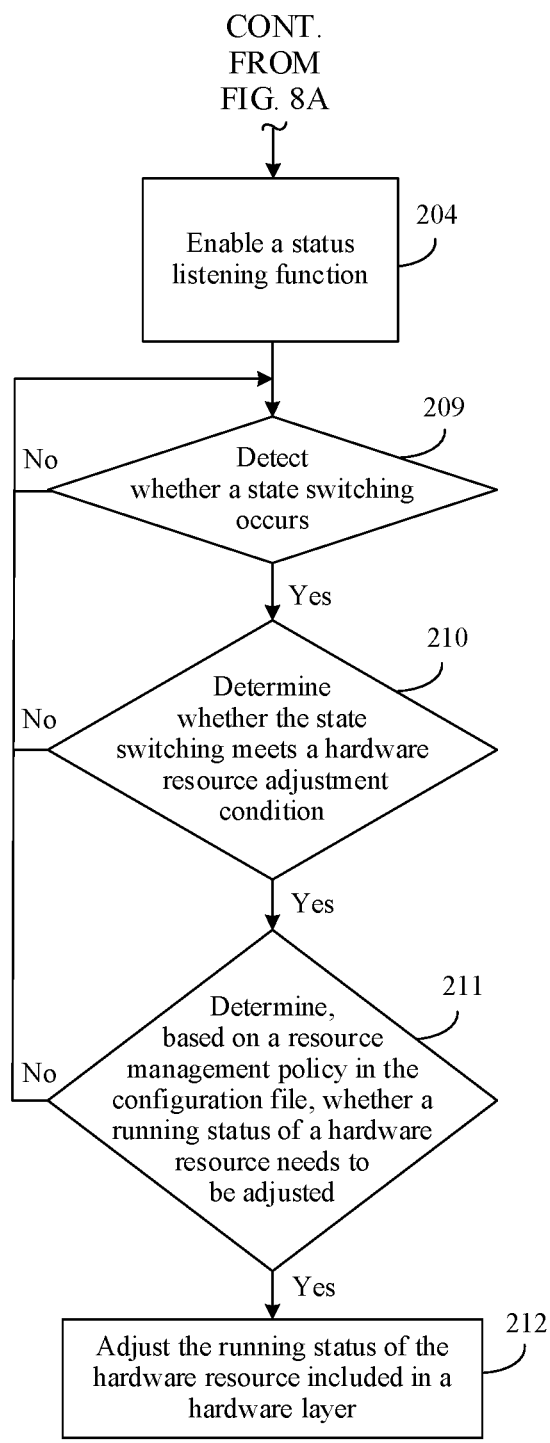

The following describes a parameter configuration method provided in an embodiment of this application by using an example in which an EM module at a service layer is a target service module. Refer to FIG. 8A and FIG. 8B. The method may include the following steps.

Step 201: Read a configuration file.

In this embodiment of this application, after being started, the EM module may first read the configuration file stored at a hardware layer. Then, the EM module may perform the following step 202, step 203, and step 204.

Step 202: Start another service module at the service layer based on the configuration file, and start an application at an application layer.

Based on a configuration parameter in the configuration file, the EM may start the other service module (for example, a CM module and an SM module) at the service layer, and start the application at the application layer.

Step 203: Enable an instruction listening function.

The EM module may enable the instruction listening function based on the configuration file, and perform step 205.

Step 204: Enable a status listening function.

In this embodiment of this application, the EM module may further enable the status listening function based on the configuration file, and perform step 209.

Step 205: Detect whether an instruction is received.

After enabling the instruction listening function, the EM module can detect in real time whether an instruction sent by another device (for example, a configuration tool) is received. If the EM module receives the instruction, step 206 may be performed. If the EM module does not receive the instruction, step 205 may continue to be performed, that is, detect whether an instruction is received.

Step 206: Parse an instruction type.

After receiving the instruction, the EM module may parse the instruction to determine an instruction type of the instruction.

Step 207: If the instruction is a configuration instruction, obtain a hardware resource parameter.

If the EM module determines that the instruction is a configuration instruction delivered by the configuration tool and used to instruct to obtain a hardware resource parameter, the EM module may obtain, according to the configuration instruction, the hardware resource parameter of a hardware resource included in the hardware layer.

Step 208: Send the hardware resource parameter to the configuration tool.

After obtaining the hardware resource parameter, the EM module may send the hardware resource parameter to the configuration tool through a communication interface.

Step 209: Detect whether a state switching occurs.

In step 204, after enabling the status listening function, the EM module may monitor a status of an embedded device in real time, and determine whether a state of the embedded device is switched. If the EM module determines that the state of the embedded device is switched, step 210 may be performed. If the EM module determines that the state of the embedded device is not switched, the EM module may continue to perform step 209, that is, continue to monitor the status of the embedded device.

For example, when detecting that a new process is started or a process is restarted, the EM module may determine that the state switching occurs in the embedded device.

Step 210: Determine whether the state switching meets a hardware resource adjustment condition.

After determining that the state of the embedded device is switched, the EM module may further continue to determine whether the state switching meets the hardware resource adjustment condition, that is, determine whether the state switching affects hardware resource scheduling. If the EM module determines that the state switching meets the hardware resource adjustment condition, step 211 may be performed. If the EM module determines that the state switching does not meet the hardware resource adjustment condition, step 209 may continue to be performed. For an implementation process of step 210, refer to step 1071. Details are not described herein again.

Step 211: Determine, based on a resource management policy in the configuration file, whether a running status of the hardware resource needs to be adjusted.

If the EM module determines that the state switching affects hardware resource scheduling, the EM module may determine, based on a second property in the resource management policy, whether the running status of the hardware resource needs to be adjusted. If the EM module determines that the running status of the hardware resource needs to be adjusted, step 212 may be performed. If the EM module determines that the running status of the hardware resource does not need to be adjusted, step 209 may continue to be performed. For an implementation process of step 211, refer to step 1072. Details are not described herein again.

Step 212: Adjust the running status of the hardware resource included in the hardware layer.

If the EM module determines that the running status of the hardware resource needs to be adjusted, the EM module may adjust, in a resource management manner indicated by a first property in the resource management policy, the running status of the hardware resource included in the hardware layer. For an implementation process of step 212, refer to step 1073. Details are not described herein again.

For example, the service layer may adjust a running status of a processor based on the resource management policy in the configuration file to achieve the following effects:

1. When it is detected that a process (for example, an autonomous driving process) running in a processor core is in a zombie state, the processor core is disabled, or a frequency of the processor core is reduced.
2. When it is detected that CPU usage of a processor core is lower than a threshold or a processor core is not executing a task, the processor core is disabled, or a frequency of the processor core is reduced.
3. When it is detected that overall CPU usage of the processor is lower than a threshold, some processor cores are disabled, or frequencies of some processor cores are reduced. The processor core whose frequency is disabled or reduced may be a high-performance processor core in the CPU.
4. When it is detected that resource consumption of a task currently executed by the embedded device is relatively low, for example, when it is detected that the embedded device executes an upgrade task or an automatic parking task, or an autonomous driving mode is not on, some processor cores may be disabled, or frequencies of some processor cores may be reduced.

It can be learned based on the foregoing examples that, in the method provided in this embodiment of this application, a CPU can be flexibly scheduled based on a status of the embedded device in a running process of the embedded device. In other words, the method provided in this embodiment of this application can implement CPU hot plugging.

In conclusion, this embodiment of this application provides a parameter configuration method. A service layer in an embedded device may directly obtain a hardware resource parameter of a hardware layer, and send the hardware resource parameter to an AUTOSAR development tool. A developer does not need to manually enter the hardware resource parameter in the development tool. Therefore, parameter configuration efficiency can be effectively improved, and application development efficiency can be further improved.

In addition, because the service layer may further adjust a running status of a hardware resource based on a resource management policy in a configuration file, flexible scheduling of the hardware resource can be implemented. This can ensure that power consumption of the embedded device is effectively reduced without affecting proper running of the embedded device.

Figure 9:
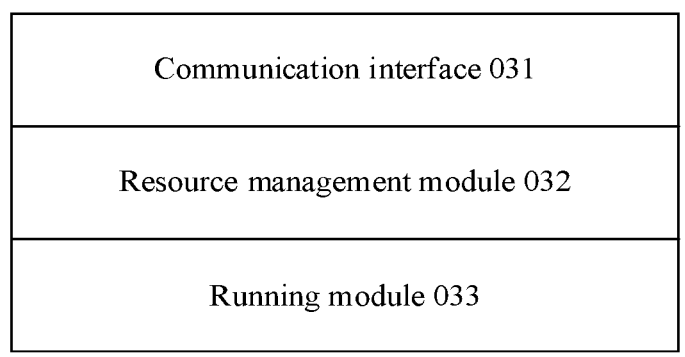
FIG. 9 is a schematic diagram of a structure of a server layer according to an embodiment of this application.

An embodiment of this application further provides an embedded device. The embedded device may be applied to a vehicle, for example, may be applied to an intelligent vehicle, a connected vehicle, a new energy vehicle, or the like. The embedded device uses AUTOSAR, for example, may use an AUTOSAR AP architecture or an AUTOSAR CP architecture. As shown in FIG. 1, the embedded device may include the hardware layer 01, the service layer 03, and the application layer 04. As shown in FIG. 4 and FIG. 9, the service layer 03 includes the resource management module 032 configured to obtain a hardware resource parameter of the hardware layer, where for function implementation of the resource management module 032, refer to related descriptions of step 102 and step 207 in the foregoing method embodiments, the communication interface 031 configured to send the hardware resource parameter to an AUTOSAR development tool, where the hardware resource parameter is used by the AUTOSAR development tool to generate an executable file and a configuration file, and the executable file and the configuration file may be stored at the hardware layer of the embedded device, and for function implementation of the communication interface 031, refer to related descriptions of step 103 and step 208 in the foregoing method embodiments, and a running module 033 configured to run the executable file based on the configuration file, where for function implementation of the running module 033, refer to related descriptions of step 106 in the foregoing method embodiment.

Optionally, the configuration file includes a resource management policy. The resource management module 032 may be further configured to adjust, based on the resource management policy, a running status of a hardware resource included in the hardware layer. For function implementation of the resource management module 032, refer to related descriptions of step 107 and step 212 in the foregoing method embodiments.

Optionally, the resource management policy includes an identifier and a first property of a target hardware resource, and the first property indicates a resource management manner for the target hardware resource. The resource management module 032 may be configured to adjust, based on the resource management manner indicated by the first property, a running status of the target hardware resource indicated by the identifier.

For function implementation of the resource management module 032, refer to related descriptions of step 1073 in the foregoing method embodiment.

Optionally, the resource management policy further includes a second property. The second property indicates a startup condition for managing the target hardware resource. The resource management module 032 may be configured to, if the resource management module determines that the running status of the target hardware resource indicated by the identifier meets the startup condition indicated by the second property, adjust the running status of the target hardware resource based on the resource management manner indicated by the first property.

For function implementation of the resource management module 032, refer to related descriptions of step 1072 in the foregoing method embodiment.

Optionally, the resource management manner includes disabling the target hardware resource, or reducing a working frequency of the target hardware resource.

Optionally, the resource management module 032 may be configured to, if the resource management module detects that a state switching occurs in the embedded device and the state switching meets a hardware resource adjustment condition, adjust the running status of the hardware resource based on the resource management policy.

For function implementation of the resource management module 032, refer to related descriptions of step 1071, step 209, and step 210 in the foregoing method embodiments.

Optionally, the resource management module 032 may be configured to receive a configuration command sent by the AUTOSAR development tool, and obtain the hardware resource parameter of the hardware layer according to the configuration command. For function implementation of the resource management module 032, refer to related descriptions of step 102, and step 205 to step 207 in the foregoing method embodiments.

Optionally, the hardware resource parameter obtained by the resource management module 032 may include a machine parameter and a system parameter.

In conclusion, this embodiment of this application provides an embedded device. A service layer in the embedded device may directly obtain a hardware resource parameter of a hardware layer, and send the hardware resource parameter to an AUTOSAR development tool. A developer does not need to manually enter the hardware resource parameter in the development tool. Therefore, parameter configuration efficiency can be effectively improved, and application development efficiency can be further improved.

In addition, because the service layer may further adjust a running status of a hardware resource based on a resource management policy in a configuration file, flexible scheduling of the hardware resource can be implemented. This can ensure that power consumption of the embedded device is effectively reduced without affecting proper running of the embedded device.

It may be clearly understood by a person skilled in the art that for the purpose of convenient and brief description, for a detailed working process of the embedded device and the modules, refer to a corresponding process in the foregoing method embodiments. Details are not described herein again.

It should be understood that the embedded device provided in this embodiment of this application may be implemented by using an application-specific integrated circuit (ASIC) or a programmable logic device (PLD). The PLD may be a complex PLD (CPLD), a field-programmable gate array (FPGA), generic array logic (GAL), or any combination thereof. Alternatively, the parameter configuration method provided in the foregoing method embodiments may be implemented by using software. When the parameter configuration method provided in the foregoing method embodiments is implemented by using software, the modules in the embedded device may alternatively be software modules.

Figure 10:
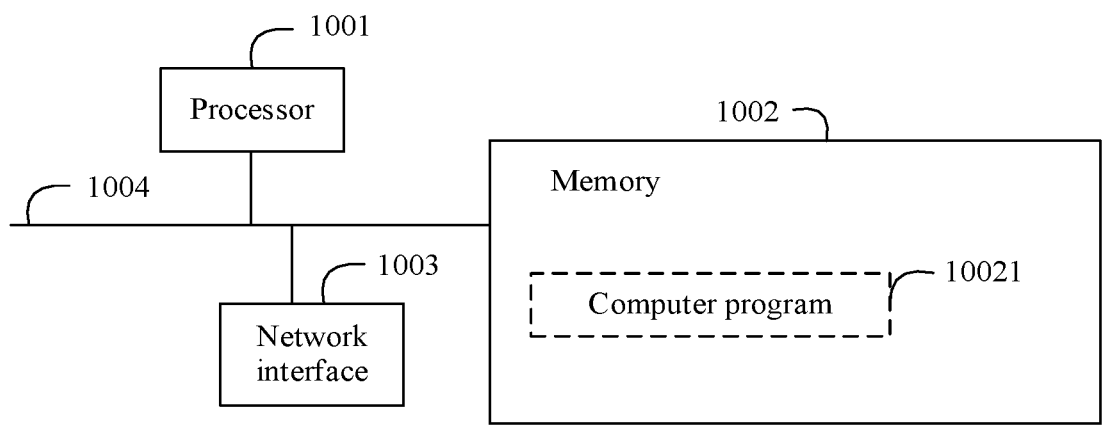
FIG. 10 is a schematic diagram of a structure of an embedded device according to an embodiment of this application.

FIG. 10 is a schematic diagram of a structure of an embedded device according to an embodiment of this application. As shown in FIG. 10, the embedded device may include a processor 1001, a memory 1002, a network interface 1003, and a bus 1004. The bus 1004 is configured to connect the processor 1001, the memory 1002, and the network interface 1003. A communication connection to another device may be implemented by using the network interface 1003 (which may be wired or wireless). The memory 1002 stores a computer program 10021, and the computer program 10021 is used to implement various application functions.

It should be understood that, in this embodiment of this application, the processor 1001 may be a CPU, or the processor 1001 may be another general-purpose processor, a digital signal processor (DSP), an ASIC, an FPGA, a graphics processing unit (GPU) or another PLD, a discrete gate or a transistor logic device, a discrete hardware component, or the like. The general-purpose processor may be a microprocessor or any conventional processor or the like.

The memory 1002 may be a volatile memory or a nonvolatile memory, or may include both a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. Through an example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a SynchLink DRAM (SLDRAM), and a direct Rambus (DR) RAM.

The bus 1004 may further include a power bus, a control bus, a status signal bus, and the like in addition to a data bus. However, for clear description, various types of buses in the figure are marked as the bus 1004.

The processor 1001 is configured to execute the computer program stored in the memory 1002, and the processor 1001 executes the computer program 10021 to implement the steps in the foregoing method embodiments.

An embodiment of this application further provides a computer-readable storage medium. The computer-readable storage medium stores instructions, and the instructions are executed by a processor to implement steps in the foregoing method embodiments.

An embodiment of this application further provides a computer program product including instructions. When the computer program product runs on a computer, the computer is enabled to perform steps in the foregoing method embodiments.

It should be understood that "and/or" mentioned in embodiments of this application indicates three relationships may exist. For example, A and/or B may indicate that only A exists, both A and B exist, and only B exists. The character "/" generally indicates an "or" relationship between the associated objects.

The term "at least one" in this application means one or more, and the term "a plurality of" in this application means two or more than two. For example, "a plurality of properties" means two or more than two properties.

All or some of the foregoing embodiments may be implemented by using software, hardware, firmware, or any combination thereof. When software is used for implementation, all or some of the foregoing embodiments may be implemented in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium. The semiconductor medium may be a solid-state drive (SSD).

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A parameter configuration method implemented by an embedded device using AUTomotive Open System ARchitecture (AUTOSAR), wherein the parameter configuration method comprises:
    obtaining, by a service layer of the embedded device, a hardware resource parameter of a hardware layer of the embedded device;
    sending, by the service layer, the hardware resource parameter to an AUTOSAR development tool to enable the AUTOSAR development tool to generate an executable file and a configuration file;
    storing, by the hardware layer, the executable file and the configuration file; and
    running, by the service layer, the executable file based on the configuration file.

2. The parameter configuration method of claim 1, wherein the configuration file comprises a resource management policy, and wherein the parameter configuration method further comprises adjusting, by the service layer based on the resource management policy, a first running status of a hardware resource comprised in the hardware layer.

3. The parameter configuration method of claim 2, wherein the resource management policy comprises an identifier and a first property of a target hardware resource, wherein the identifier identifies a second running status of the target hardware resource, wherein the first property indicates a resource management manner for the target hardware resource, and wherein the parameter configuration method further comprises adjusting, by the service layer based on the resource management manner, the second running status.

4. The parameter configuration method of claim 3, wherein the resource management policy further comprises a second property indicating a startup condition for managing the target hardware resource, and wherein adjusting the second running status comprises:
    identifying, by the service layer, that the second running status meets the startup condition; and
    adjusting, by the service layer in response to identifying that the second running status meets the startup condition, the second running status based on the resource management manner.

5. The parameter configuration method of claim 3, wherein the resource management manner comprises disabling the target hardware resource or reducing a working frequency of the target hardware resource.

6. The parameter configuration method of claim 2, wherein adjusting the first running status comprises:
    identifying, by the service layer, that a state switching occurs in the embedded device and the state switching meets a hardware resource adjustment condition; and adjusting, by the service layer in response to identifying that the state switching occurs in the embedded device and the state switching meets the hardware resource adjustment condition, the first running status based on the resource management policy.

7. The parameter configuration method of claim 1, wherein obtaining the hardware resource parameter comprises:
   receiving, by the service layer, a configuration command from the AUTOSAR development tool; and
   obtaining, by the service layer, the hardware resource parameter according to the configuration command.

8. The parameter configuration method of claim 1, wherein the hardware resource parameter comprises a machine parameter and a system parameter.

9. An embedded device that uses an AUTomotive Open System ARchitecture (AUTOSAR), wherein the embedded device comprises:
   a hardware layer configured to store an executable file and a configuration file;
   an application layer; and
   a service layer configured to:
      obtain a hardware resource parameter of the hardware layer;
      send the hardware resource parameter to an AUTOSAR development tool to enable the AUTOSAR development tool to generate the executable file and the configuration file;
      store the executable file and the configuration file at the hardware layer; and
      run the executable file based on the configuration file.

10. The embedded device of claim 9, wherein the hardware layer comprises a hardware resource, wherein the configuration file comprises a resource management policy, and wherein the service layer is further configured to adjust, based on the resource management policy, a first running status of the hardware resource.

11. The embedded device of claim 10, wherein the resource management policy comprises an identifier and a first property of a target hardware resource, wherein the first property indicates a resource management manner for the target hardware resource, and wherein the service layer is further configured to adjust, based on the resource management manner, a second running status of the target hardware resource indicated by the identifier.

12. The embedded device of claim 11, wherein the resource management policy further comprises a second property indicating a startup condition for managing the target hardware resource, and wherein the service layer is further configured to:
   identify that the second running status meets the startup condition; and
   further adjust, in response to identifying that the second running status meets the startup condition, the second running status based on the resource management manner.

13. The embedded device of claim 11, wherein the resource management manner comprises disabling the target hardware resource or reducing a working frequency of the target hardware resource.

14. The embedded device of claim 10, wherein the service layer is further configured to:
   identify that a state switching occurs in the embedded device and the state switching meets a hardware resource adjustment condition; and
   further adjust, in response to identifying that the state switching occurs in the embedded device and the state switching meets the hardware resource adjustment condition, the first running status based on the resource management policy.

15. The embedded device of claim 9, wherein the service layer is further configured to:
   receive a configuration command from the AUTOSAR development tool; and
   obtain the hardware resource parameter according to the configuration command.

16. The embedded device of claim 9, wherein the hardware resource parameter comprises a machine parameter and a system parameter.

17. A parameter configuration system comprising:
   an AUTomotive Open System ARchitecture (AUTOSAR) development tool configured to:
      generate an executable file and a configuration file based on a hardware resource parameter; and
   an embedded device coupled to the AUTOSAR development tool and comprising:
      a hardware layer configured to store the executable file and the configuration file;
      an application layer; and
      a service layer configured to:
         obtain the hardware resource parameter of the hardware layer;
         send the hardware resource parameter to the AUTOSAR development tool; and
         run the executable file based on the configuration file.

18. The parameter configuration system of claim 17, wherein the hardware layer comprises a hardware resource, wherein the configuration file comprises a resource management policy, and wherein the service layer is further configured to adjust, based on the resource management policy, a first running status of the hardware resource.

19. The parameter configuration system of claim 18, wherein the resource management policy comprises an identifier and a first property of a target hardware resource, wherein the first property indicates a resource management manner for the target hardware resource, and wherein the service layer is further configured to adjust, based on the resource management manner, a second running status of the target hardware resource indicated by the identifier.

20. The parameter configuration system of claim 19, wherein the resource management policy further comprises a second property indicating a startup condition for managing the target hardware resource, and wherein the service layer is further configured to:
   identify that the second running status meets the startup condition; and
   further adjust, in response to identifying that the second running status meets the startup condition, the second running status based on the resource management manner.

\* \* \* \* \*